Jan. 30, 1951   W. R. EAMES   2,539,821
KEY DRIVE
Filed March 31, 1945
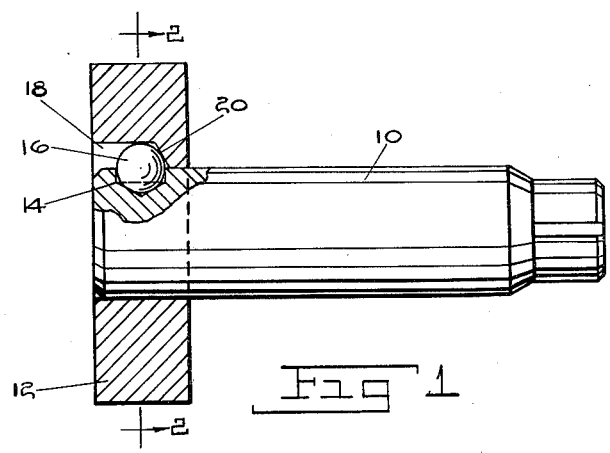
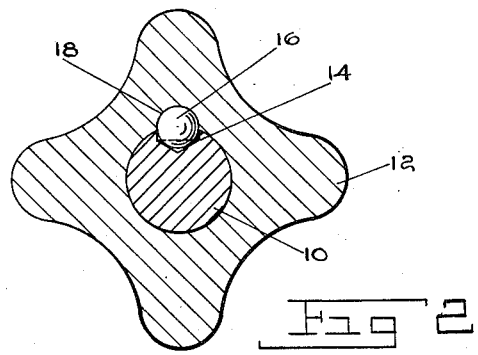
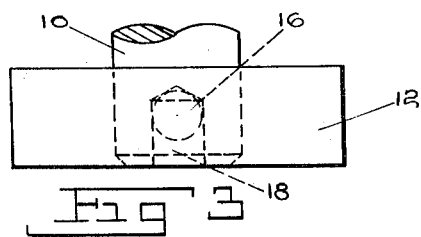
INVENTOR.
WALTER R. EAMES
BY
McDonald and Teagno
ATTORNEYS Patented Jan. 30, 1951

2,539,821

UNITED STATES PATENT OFFICE 2,539,821

KEY DRIVE

Walter R. Eames, Warren Township, Macomb County, Mich., assignor to Eaton Manufacturing Company, Cleveland, Ohio, a corporation of Ohio Application March 31, 1945, Serial No. 585,985

10 Claims. (Cl. 287—52.05)

This invention relates to means for non-rotatively fastening a member to a shaft and more particularly to a novel key drive.

Broadly the invention comprehends the provision of a key drive comprising a ball suitably received by a shaft and a member to be driven by the shaft so as to provide an effective non-rotative fastening between the shaft and member. Heretofore although numerous forms of keys and associated key ways have been developed for providing drive means between rotatable shafts and members to be driven thereby, none have proved universally adaptable. The instant invention is aimed at providing an inexpensive key drive having advantages over previously devised drives.

An object of this invention is the provision of a simple, inexpensive key drive.

Another object of this invention is the provision of a ball key drive.

Another object of this invention is the provision of a ball key drive capable of resisting key cocking type of wear.

Another object of this invention is the provision of a key drive for non-rotatively securing a driven member upon a drive member such that the end thrust of the drive member is transmitted to the driven member.

A further object of this invention is the provision of a key drive occupying a small axial space on a shaft and member to be coupled to the shaft.

A yet further object of the invention is the provision of a key drive wherein greater tolerances can be allowed in fitting the parts together.

A still further object of the invention is the provision of a key drive that can be cheaply manufactured, easily assembled, and which has long wear life.

Other objects and advantages of the invention will appear from the following description taken in connection with the drawings forming a part of the specification, and in which:

Figure 1 is a side elevational view of a rotatable shaft with a rotor secured thereto by a ball key drive constituting the basis of this invention;

Figure 2 is a vertical sectional view through 2—2 of Figure 1; and

Figure 3 is a fragmentary top plan view of Figure 1.

The present invention is premised upon the provision of a key drive for fastening a relatively thin member such as a rotor upon a rotatable shaft. The ball key drive herein devised to accomplish this purpose possesses features over previously devised key drives.

The square key drive which is most widely used because of its cheapness is inferior to the present devised drive because failure of either the key or keyway occurs due to the cocking action of the key resulting in high unit loads at the thin keyslot edges. The Woodruff key operates in practically pure shear thereby causing failure of the key because of shear fatigue stresses induced. In the case of the ball key drive set forth herein, the ball key is subjected to high initial wear after which the resultant load is composed of shear and compression forces, directing the load to a heavier section of the keyslot. Also, the ball tends to rotate thus bringing new areas to the loaded section thereby preventing fatigue, and distributing wear.

From a manufacturing standpoint this ball key drive is superior to other drives in that it is only necessary to provide a shaft with a hole of controlled depth so that a substantial portion of the ball protrudes beyond the circumference of the shaft when in assembled position in the shaft. Because of the curved surface of the ball it is unnecessary that very close tolerances be maintained or that the hole in the shaft receiving the ball be held central with the shaft as is the case with other key drives wherein great care must be exercised in the radial and longitudinal alignment of the key way in the shaft.

Referring to the drawings for more specific details of the invention, 10 represents a rotatable shaft mounting by way of example a rotor 12 of relatively narrow width. The shaft 10 is provided with a radial hole 14 of controlled depth adapted to receive a ball 16 such that substantially a hemispherical portion of the ball protrudes from the shaft when assembled therein.

The rotor 12 is provided with an axial slot 18 extending through the greater portion of the axial width of the rotor, said slot having a substantially semi-circular cross section so as to be adapted to receive the ball in close conformity thereto. In the assembly of the rotor upon the shaft in non-rotative relationship therewith, with the ball received by the hole in the shaft, the rotor is slid over the shaft and ball such that the portion of the ball protruding from the shaft is received by the slot 18 and the rotor moved to a point on the shaft wherein a curved portion of the ball bears on the bottom 20 of slot 18 and thus restrains movement of the rotor in one axial direction. The rotor is adapted to be restrained from axial movement in the other direction when assembled in an appropriate housing, not shown, thereby providing positive locking engagement of the rotor or like member upon the shaft.

Because of the constant circular nature of the ball employed as a locking key between the members fastened together, the tolerances between ball 16, hole 14, and slot 18 need not be held at close limits nor is it necessary that the hole 14 be held central with the shaft or the slot longitudinal with either the rotor or shaft.

Although the ball key herein defined is shown and described as applied to a drive means between a rotatable shaft and a member driven thereby, it is equally applicable to other uses such as a connection between an abutment and a reaction member.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A drive for securing a member upon a rotatable shaft constituting a ball key, said shaft having a hole in its peripheral surface of slightly greater diameter than the ball and receiving the ball therein, and said member having an axial slot on its inner surface of greater length than depth receiving that portion of the ball protruding from the hole in the shaft, said slot being of arcuate cross-sectional shape conforming with the circular shape of the ball adapted to closely embrace the ball as received therein.

2. A drive for non-rotatively mounting a member upon a rotatable shaft, said shaft having a hole of depth slightly less than its width in its peripheral surface, said member having an axial slot on its inner periphery partly through the axial width thereof extending in open relation from one face thereof and terminating short of the other face thereof, and a key of spherical shape received partially by the hole in the shaft and partially by the slot in the member for non-rotatively locking the shaft and member together.

3. A drive for non-rotatively mounting a driven part upon a driving part comprising a spherical key, a rotatable shaft having a radially extended circular hole of depth equal to substantially half the height of the key receiving a portion of the key and a member, adapted to be driven by the shaft having a semi-circular cross-sectional shaped, uniform depth slot on its inner diameter of greater axial length than depth embracing the portion of the key extending out of the hole in the shaft.

4. A drive for securing a driven member to a driving member comprising a ball key, a rotatable shaft having a hole in the surface thereof of slightly greater diameter and depth equal to approximately one-half the diameter of the ball for the receipt thereof, and a member having an axial slot throughout a substantial portion of its width at its inner periphery receiving the ball when the member is assembled upon the shaft.

5. A drive for securing a driven member to a driving member comprising a rotatable shaft having a substantially radial hole in the periphery thereof, a member adapted to be secured upon the shaft in non-rotative relation thereto having a substantially semi-circular cross sectional substantially axial slot in the inner periphery thereof partly through the axial width of the member, and a ball received partly by the hole in the shaft and partly by the slot in the member so as to effectively secure the member to the shaft.

6. A drive for securing a driven member to a driving member comprising a rotatable shaft having a substantially radial hole of controlled depth in the surface thereof, a member driven by the shaft having a substantially axial slot along the inner periphery thereof, said slot being of substantially semi-circular cross section and being formed through a substantial portion of the axial width of the member, and a ball of height approximately twice the depth of the hole and radius substantially equal to the radius of the slot received by the hole and slot in close conformity thereto for securing the shaft to the member.

7. A key connection for securing a pair of members together comprising a member having a substantially radial hole of controlled depth in the surface, a second member having a central bore and a substantially axial slot along the inner periphery thereof, said slot being of substantially semi-circular cross section and being formed through a substantial portion of the axial width of the second member, and a ball of height approximating the diameter of the slot received by the hole and slot in close conformity thereto for securing the members together.

8. A key connection for securing a pair of rotatable members together comprising a member having a substantially radially extended circular hole in its peripheral surface, a second member having a central bore, and a substantially axial slot along the inner periphery thereof extending axially a substantial amount more than the depth thereof, and a ball of height approximating the diameter of the hole received by the hole and slot in close conformity thereto for securing the members together.

9. A key connection for securing a pair of members together comprising a member having a radially extended circular hole in its peripheral surface, a second member associated with the first member and having a slot in a peripheral surface thereof mating with the peripheral surface of the first member, said slot being of semi-circular cross-sectional shape having a greater axial length than depth and a ball having a diameter approximating the diameter of the hole and width of the slot received by the hole and slot in close conformity thereto for securing the members together, said depth of the slot being uniform throughout the full exposed axial length of the slot in the peripheral surface of the first member.

10. A key connection for securing a pair of members together comprising a member having a slot in the peripheral surface thereof, a second member associated with the first member having a slot in a peripheral surface thereof mating with the peripheral surface in the first member, said slot in the second member extending in an axial direction from the end face of the second member, and spherical means received in the slots between the members for securing them together.

WALTER R. EAMES.

REFERENCES CITED

The following references are of record in the file of this patent:

UNITED STATES PATENTS

| Number | Name | Date |
|---|---|---|
| 1,244,848 | Gadke | Oct. 30, 1917 |
| 1,621,811 | Richard et al. | Mar. 22, 1927 |
| 2,290,215 | Stenberg | July 21, 1942 |